United States Patent [19]

Lang et al.

[11] Patent Number: 4,968,256

[45] Date of Patent: Nov. 6, 1990

[54] ARTIFICIAL DENTURE-SKULL FOR DENTAL PURPOSES

[75] Inventors: Hans-Walter Lang, Leutkirch; Alfred Straka, Isny, both of Fed. Rep. of Germany

[73] Assignee: Kaltenbach & Voigh GmbH & Co., Biberachan der Riss, Fed. Rep. of Germany

[21] Appl. No.: 339,177

[22] Filed: Apr. 14, 1989

[30] Foreign Application Priority Data

May 10, 1988 [DE] Fed. Rep. of Germany ....... 3816007

[51] Int. Cl.⁵ .............................................. G09B 23/00
[52] U.S. Cl. ..................................... 434/263; 434/264; 433/57
[58] Field of Search .................. 434/263, 264; 433/54, 433/55, 56, 57, 58, 59, 187, 188

[56] References Cited

U.S. PATENT DOCUMENTS

| | | |
|---|---|---|
| 1,166,796 | 1/1916 | Weisse . |
| 2,670,538 | 3/1954 | Thompson ........................ 433/58 X |
| 3,387,369 | 6/1968 | Swanson ............................... 433/58 |
| 4,034,475 | 7/1977 | Lee ................................... 433/57 X |
| 4,601,664 | 7/1986 | Bertino, III et al. . |

Primary Examiner—Robert Bahr
Assistant Examiner—Rachel M. Healey
Attorney, Agent, or Firm—Scully, Scott, Murphy & Presser

[57] ABSTRACT

An artificial denture-skull for dental teaching and practice purposes, consisting of the model of an upper jaw which is equipped with teeth and of the model of a lower jaw which is equipped with teeth, the lower jaw model being connected with the upper jaw model for pivotal movement through the intermediary of two jaw linkages which are arranged at respectively both sides of the jaw models, whereby the lower jaw model is presently equipped with an articulated ball belonging to the jaw linkages and which is guided within an articulating track arranged in an articulating box on the upper jaw model. For the most possible exact simulation of the human head, the denture-skull can also be provided with a cerebral skull portion, as well as with a pocket-shaped covering possessing an oral or mouth aperture, for the resultant formation of a complete phantom head.

9 Claims, 3 Drawing Sheets

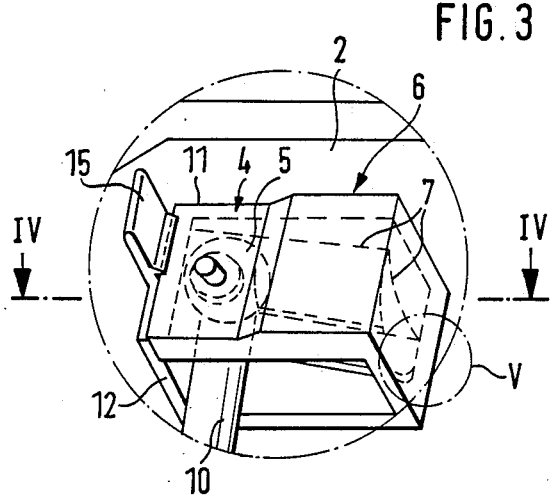
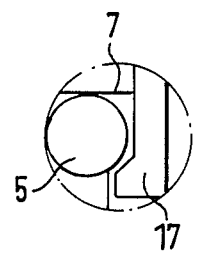
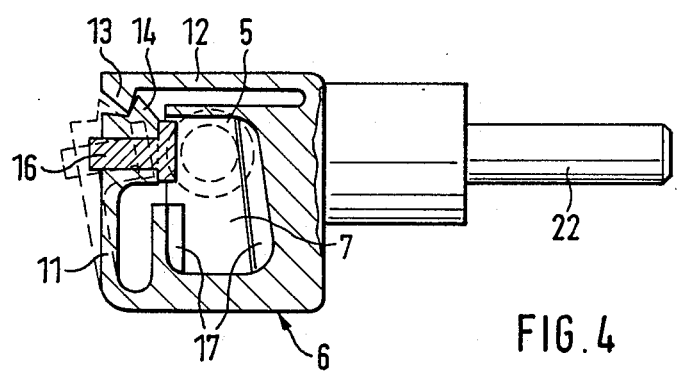

FIG.7
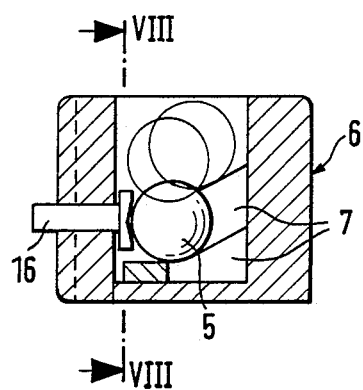
FIG.8
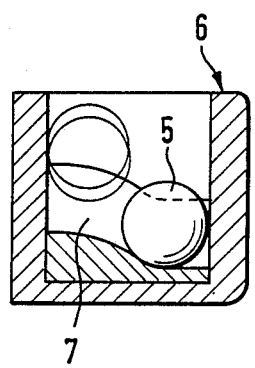
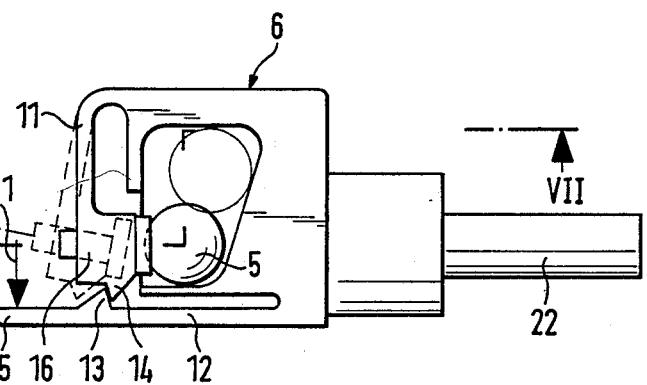
FIG.6

ARTIFICIAL DENTURE-SKULL FOR DENTAL PURPOSES

BACKGROUND OF THE INVENTION

1. Field of the Invention

The present invention relates to an artificial denture-skull for dental teaching and practice purposes, consisting of the model of an upper jaw which is equipped with teeth and of the model of a lower jaw which is equipped with teeth, the lower jaw model being connected with the upper jaw model for pivotal movement through the intermediary of two jaw linkages which are arranged at respectively both sides of the jaw models, whereby the lower jaw model is presently equipped with an articulated ball belonging to the jaw linkages and which is guided within an articulating track arranged in an articulating box on the upper jaw model. For the most possible exact simulation of the human head, the denture-skull can also be provided with a cerebral skull portion, as well as with a pocket-shaped covering possessing an oral or mouth aperture, for the resultant formation of a complete phantom head.

2. Discussion of the Prior Art

A denture-skull of this type has become known from the brochure "Frasaco" issued by Franz Sachs & Co. GmbH Kunststoffverarbeitung, pages 17-19, and from the specification of German Patent No. 28 33 835. In these known denture-skulls, the articulated balls are freely rotatable within the articulating box, so that it is not possible to fixedly orient the two jaw models in a correct position relative to each other, which would be desirable for certain types of work carried out by the practicing person. The present invention, as is described in more extensive detail herein, has as an object the provision of an artificial denture-skull of the above-mentioned type, in which the two jaw models can, in a simple manner, be correctly fixed in position with respect to each other, for example, in the normal basic jaw position.

Through the advantages which are achievable by means of the present invention, there can be essentially ascertained that as a consequence of the latchable arrangement of the articulated balls in the respective articulating box, it is possible in a simple manner to fix the lower jaw model in a predetermined correct position; for example, in the closed position thereof, in effect, in contact with the upper jaw model.

BRIEF DESCRIPTION OF THE DRAWINGS

Further features and advantages of the invention can now be readily ascertained in the following detailed description of exemplary embodiments thereof, taken in conjunction with the accompanying drawings; in which:

FIG. 3 illustrates, in an enlarged scale, the articulating box for the jaw linkage for the denture-skull, taken from the encircled portion III in FIG. 2;

FIG. 4 illustrates a sectional view taken along line IV—IV in FIG. 3;

FIG. 5 illustrates a fragmentary sectional view from the encircled portion V in FIG. 3;

FIG. 6 illustrates a bottom view of the articulating box;

FIG. 7 illustrates a sectional view taken along lines VII—VII in FIG. 6; and

FIG. 8 illustrates a sectional view taken along line VIII—VIII in FIG. 7.

DETAILED DESCRIPTION OF THE PREFERRED EMBODIMENTS

Figure 1:
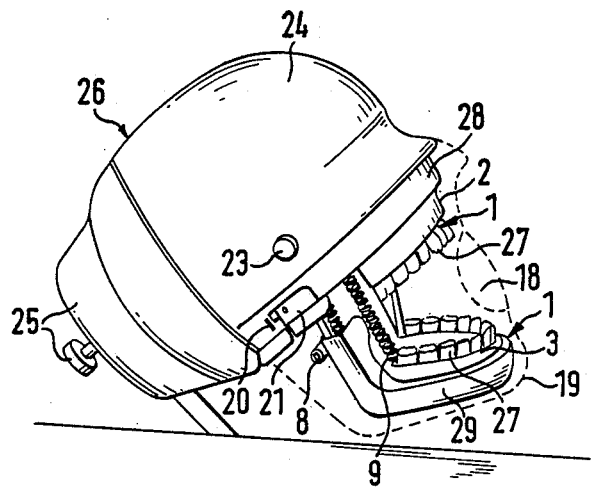
FIG. 1 illustrates a side view of the denture-skull in the open position with an attached cerebral-cavity skull portion.

The artificial denture-skull 1 consists of an upper jaw model 2 and a lower jaw model 3, in which the lower jaw model 3 is connectable for pivoting movement with the upper jaw model 2 through the intermediary of two jaw linkages 4 which are arranged at the respective sides of the jaw models 2, 3, and wherein the lower jaw model 3 presently possesses an articulated ball 5 which is associated with the jaw linkages 4, and movement of jaw 3 is governed by the restricted pivotal and translational movement of ball 5 within an articulating track 7 arranged in an articulating box 6 of the upper jaw model 2.

Through the intermediary of the releasable latching device 23, the denture-skull 1 is connected with a cranial or cerebral cavity-defining skull 24. Reference numeral 25 identifies retainer and adjusting devices for the phantom head 26, the latter of which is formed by the denture-skull 1 and the cerebral skull 24. The teeth on the upper jaw model 2 and on the lower jaw model 3 are identified by reference numerals 27.

Reference numeral 28 identifies an upper support plate which carries the upper jaw model 2, and reference numeral 29 identifies a lower support plate which carries the lower jaw model 3. The articulating boxes 6 are fastened to the upper support plate 28, whereas the articulated balls 5 are connected with the lower support plate 29.

As can be ascertained in particular from FIGS. 3, 4 and 6, the articulated balls 5 are arrestable in position in their respective articulating box 6.

Figure 2:
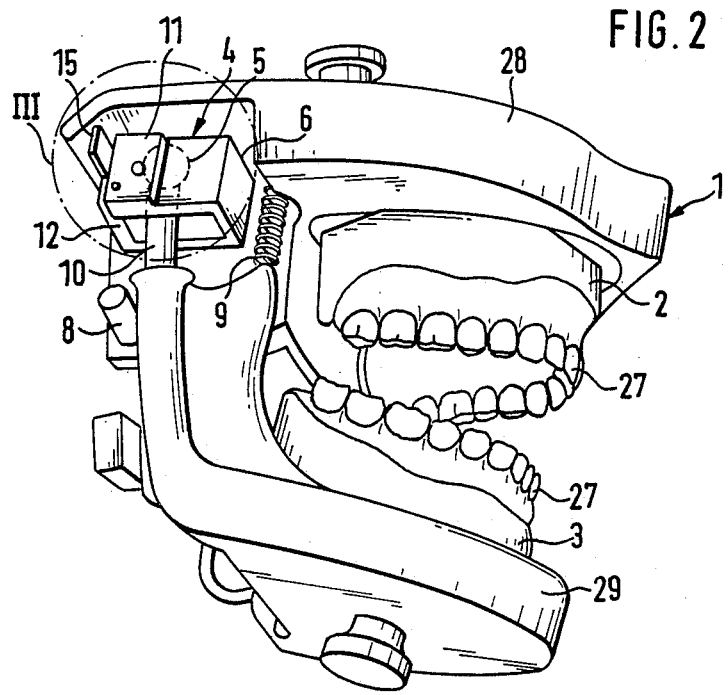
FIG. 2 illustrates, in a perspective view, the denture-skull pivoted downwardly at a limited angle out of its closed position.

The lower jaw model 3, in the latched position thereof, is displaceable through a pivoting angle which is limited by a stop 8 arranged on the upper jaw model 2, into the position ascertainable in FIG. 2. Hereby, the lower jaw model 3 is pivotable, opposite the action of a locking spring arrangement 9 which is formed from spiral springs, from the upper jaw model 2 downwardly until contacting the stop 8. The locking spring arrangement 9 also causes the articulated balls 5 to be pressed against their associated articulating tracks 7.

As indicated in FIGS. 2 and 3, the articulated balls are arranged at the upper ends of articulating or linkage rods 10 which are provided on the lower jaw model 3.

It is particularly expedient when the articulated balls 5 are latchable in their centered position; in essence, in a position in which the lower jaw model 3, relative to the upper jaw model 2 is located in the rearmost location thereof and is not displaced sideways.

From FIGS. 3, 4 and 6 there can be further ascertained that the articulating box 6 presently possesses two mutually angled sidewalls 11, 12, which are resiliently latchable and unlatchable with regard to each other through latching devices, of which the one sidewall 11 in the latched position thereof, arrestingly contacts against the articulated ball 5 from the side.

Hereby, the configuration is such that the sidewalls 11, 12 possess latching hooks 13, 14 as latching means on the mutually adjoining edges, which are resiliently interengageable with each other into a mutually latched position, whereby the sidewall 12 possessing latching hook 13 which engages from the outside is provided with a handle 15 which facilitates the unlatching, and whereby the other sidewall 11 can be pressed into the latched position thereof by overcoming the spring force from the sidewall 12.

In FIG. 6, the direction of pressure exerted against the sidewall 11 is identified by reference numeral 30, and the direction of pressure against the handle 15 by reference numeral 31.

Thereby, the sidewall 11 which arrests the articulated ball 5 possesses a pressure piece 16 for contact against the articulated ball.

In order to avoid any raising away of the articulated ball 5 from the articulating track 7, in essence, to prevent any contamination or fouling of the articulating track 7, the articulating track 7 which is provided for the guidance of the articulated ball 5 which is to be arrested in position, is presently equipped with a positive guide edge 17 for the articulated ball, as shown in FIGS. 4 and 5 and which edge 17 forms a portion of track 7 to narrow the path of travel of ball 5.

As is illustrated in FIG. 1, the denture-skull is provided with a pocket-shaped covering 19 which is constituted from an elastic material and which possesses a oral or mouth opening 18, and which includes markings 20, 21 rendering easier the locating of handle 15 and of the sidewall 11 which arrests the articulated ball 5.

As indicated in FIGS. 4 and 6, each of the two articulating boxes 6 respectively include a mounting axle 22 which serves for the support thereof on the upper jaw model 2.

What is claimed is:

1. Artificial denture-skull comprising a model of an upper jaw and a model of a lower jaw; jaw linkage means for interconnecting said jaw models being located on both sides of said jaw models, said lower jaw model having an articulated ball associated with the jaw linkage means which is conducted along an articulating track arranged in an articulating box on either side of the upper jaw model; and said articulated balls being latchable in position with the associated articulating box; said articulating box including two mutually angled sidewalls constituting an integral wall structure of said articulating box and forming said articulating track for receiving said ball therebetween; said sidewalls having cooperating latching means for resiliently latching and unlatching said sidewalls to each other, said articulated ball being movable independently of said sidewalls, one said sidewall in the latched position thereof having a side thereof arrestingly contacting against the articulated ball, said latching means being located on the adjoining edges of said sidewalls and including latching hooks which are resiliently interengageable, one said sidewall having a latching hook which is engageable from the outside being equipped with a handle facilitating the unlatching of said hook and the other sidewall being pressable into the latched position upon overcoming a spring force exerted from the sidewall, whereby in the latched position of said sidewalls, said interengaging latching hooks provide substantially the sole arresting action for the articulated ball in the articulating box.

2. Denture-skull as claimed in claim 1, wherein the lower jaw model, in the latched position thereof is pivotable through a limited pivoting angle defined by a stop on the upper jaw model.

3. Denture-skull as claimed in claim 2, wherein the lower jaw model is pivotable downwardly against the action of closing spring means from the upper jaw model to contact against said stop.

4. Denture-skull as claimed in claim 1, wherein said articulated balls are arranged at the upper ends of articulating struts mounted on the lower jaw model.

5. Denture-skull as claimed in claim 1, wherein said articulated balls are arrestable in a central position in which the lower jaw model is in an open most position relative to the upper jaw model and is sideways undisplaced relative to the upper jaw model.

6. Denture-skull as claimed in claim 1, wherein the sidewall which arrests the articulated ball includes a pressure piece for contacting against the articulated ball.

7. Denture-skull as claimed in claim 1, wherein the articulating track for the guidance of the articulated ball which is to be arrested is equipped with a guiding edge for the positive guidance of the articulated ball.

8. Denture-skull as claimed in claim 1, wherein said skull includes a pocket-shaped covering having a mouth opening, said covering having markings thereon facilitating the locating of the handle and of the sidewall which arrests the articulated ball.

9. Denture-skull as claimed in claim 1, wherein the articulating box includes a mounting axle for support of the box on the upper jaw model.

* * * * *